(12) United States Patent
Schmitt

(10) Patent No.: US 11,382,401 B2
(45) Date of Patent: Jul. 12, 2022

(54) WATERFOWL DECOY CARRIER AND BLIND SYSTEM

(71) Applicant: Carry and Cover, LLC, Chandlersville, OH (US)

(72) Inventor: Mathew F. Schmitt, Chandlersville, OH (US)

( * ) Notice: Subject to any disclaimer, the term of this patent is extended or adjusted under 35 U.S.C. 154(b) by 0 days.

(21) Appl. No.: 17/141,045

(22) Filed: Jan. 4, 2021

(65) Prior Publication Data
US 2021/0227955 A1 Jul. 29, 2021

Related U.S. Application Data

(62) Division of application No. 15/233,751, filed on Aug. 10, 2016, now abandoned.

(51) Int. Cl.
| | |
|---|---|
| *A45F 3/04* | (2006.01) |
| *A01M 31/02* | (2006.01) |
| *E04H 15/30* | (2006.01) |
| *A45F 3/44* | (2006.01) |
| *A45F 4/02* | (2006.01) |

(52) U.S. Cl.
CPC ............ *A45F 3/04* (2013.01); *A01M 31/025* (2013.01); *A45F 3/44* (2013.01); *A45F 4/02* (2013.01); *E04H 15/30* (2013.01)

(58) Field of Classification Search
CPC .... A45F 3/04; A45F 3/44; A45F 4/02; A01M 31/025; E04H 15/30
USPC ........................................................ 224/154
See application file for complete search history.

(56) References Cited

U.S. PATENT DOCUMENTS

| | | | | |
|---|---|---|---|---|
| 1,141,941 A | * | 6/1915 | Danz ......................... | A45F 3/04 224/655 |
| 1,385,224 A | * | 7/1921 | Orr ......................... | A45C 13/38 224/616 |
| 2,475,914 A | * | 7/1949 | Peterson ................ | A01K 97/06 24/712 |
| 2,507,842 A | * | 5/1950 | Waddill .................. | B60R 7/043 224/547 |
| 3,014,759 A | * | 12/1961 | Bing ....................... | B60R 7/043 224/543 |
| 3,967,666 A | * | 7/1976 | Farrar ................... | A61G 7/0503 383/7 |
| 5,294,030 A | * | 3/1994 | Jollivette .................. | A45F 3/00 224/648 |
| 5,337,907 A | * | 8/1994 | McKenzie ................ | A45F 3/00 206/427 |

(Continued)

*Primary Examiner* — Peter N Helvey
(74) *Attorney, Agent, or Firm* — Bryce D. Miracle, Esq.; MIP Legal, Ltd.

(57) ABSTRACT

A waterfowl decoy carrier and blind system configured to hold a plurality of waterfowl decoys in a balanced, hands free manner for efficient transport to and from a desired hunting location. The carrier is uniquely configured to accommodate the irregular shape of the decoys radially about the hunter's midsection while supported by the hunter's shoulders. The waterfowl decoy carrier generally comprises a rectangular body having a top perimeter and a plurality of upward opening linearly aligned pockets. Each pocket is configured and sized to receive one or more waterfowl decoys. In an embodiment, one or more waterfowl decoy carriers can be used in combination to provide a visual blind barrier forming a waterfowl hunting blind system.

6 Claims, 7 Drawing Sheets

(56) References Cited

U.S. PATENT DOCUMENTS

| | | | | |
|---|---|---|---|---|
| 5,390,786 A * | 2/1995 | Challoner | ............... | A45F 3/04 |
| | | | | 206/278 |
| 5,427,239 A * | 6/1995 | Hunt | ............... | B25H 3/00 |
| | | | | 190/125 |
| 6,030,121 A * | 2/2000 | Strzyinski | ............... | A45C 9/00 |
| | | | | 383/22 |
| 6,039,474 A * | 3/2000 | DeChant | ............... | A45C 3/00 |
| | | | | 383/66 |
| 6,070,729 A * | 6/2000 | Barnes | ............... | A45D 1/00 |
| | | | | 206/581 |
| 6,336,555 B1 * | 1/2002 | Breeden | ............... | B65D 33/14 |
| | | | | 206/214 |
| 6,343,694 B1 * | 2/2002 | Parnell | ............... | A61B 50/13 |
| | | | | 190/110 |
| 6,763,986 B2 * | 7/2004 | Santos | ............... | B60R 7/043 |
| | | | | 224/586 |
| 7,562,408 B1 * | 7/2009 | Johnson | ............... | B60P 3/38 |
| | | | | 5/118 |
| 8,662,368 B2 * | 3/2014 | Elliott | ............... | A45C 11/38 |
| | | | | 224/236 |
| 8,777,076 B1 * | 7/2014 | Carrier | ............... | A47C 7/62 |
| | | | | 383/4 |
| 8,910,315 B1 * | 12/2014 | Stephens | ............... | A41D 27/20 |
| | | | | 2/102 |
| 2005/0236450 A1 * | 10/2005 | Iannini | ............... | A45F 4/02 |
| | | | | 224/577 |
| 2006/0260049 A1 * | 11/2006 | Wenz | ............... | A61G 1/04 |
| | | | | 5/503.1 |

\* cited by examiner

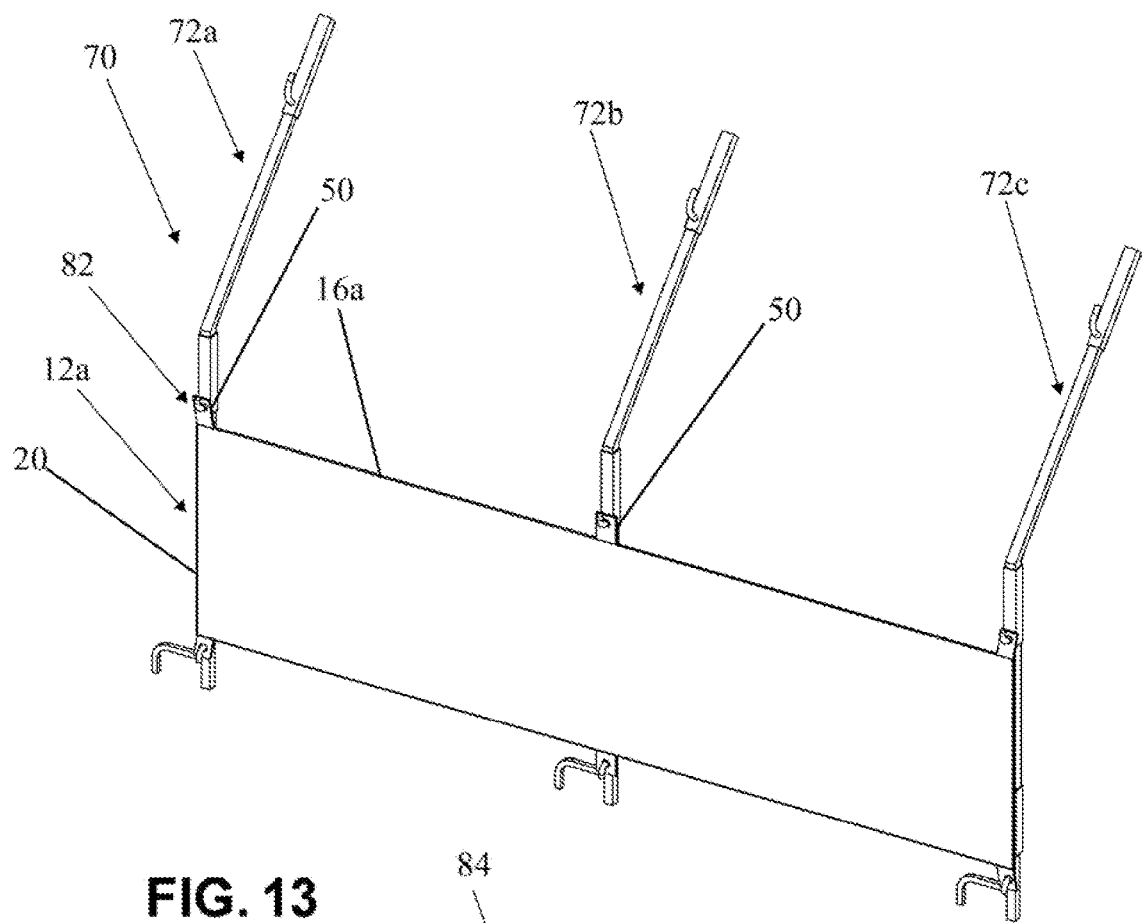
FIG. 13
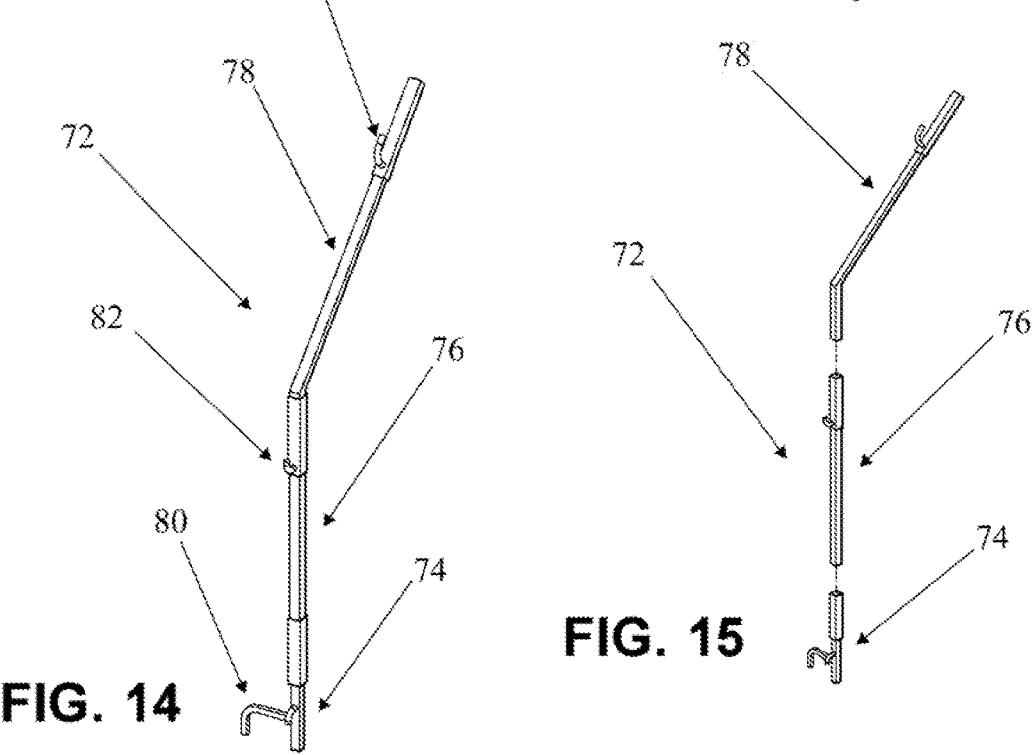
FIG. 14
FIG. 15

WATERFOWL DECOY CARRIER AND BLIND SYSTEM

CROSS-REFERENCE TO RELATED APPLICATION

This application is based upon and claims the priority filing date of the previously filed, copending U.S. patent application entitled "WATERFOWL DECOY CARRIER AND BLIND SYSTEM" filed Aug. 10, 2016, having application Ser. No. 15/233,751, the entire disclosure of which is hereby incorporated by reference.

BACKGROUND

The present invention relates to the field of hunting equipment, particularly a device for carrying waterfowl decoys.

Previous practice in duck hunting has been to transport decoys in sacks, boxes, and other containers in which such decoys are loosely placed together, each with its anchor lines wrapped around its head, body, or keel. Inevitably, this type of arrangement results in jostling and bumping together of the decoys, frequently resulting in the loosening and entanglement of the anchor lines or even damaging or breaking the decoys.

Most often, duck hunters are required to walk, sometimes considerable distances, to and from their desired hunting location. Such traditional carrying devices can be awkward to carry—and only each carry a limited number of decoys. Thus, multiple decoy carriers may need to be transported in order to provide an adequate number of decoys for the particular hunt. Large carry bags are difficult to load and carry over one shoulder—requiring the hunter to constantly shift their weight or shift the bag to the opposing shoulder which can be painful. Moreover, boxes or other containers require that they are held throughout the walk in front of the hunter—and in aggregate with hunting equipment such as a firearm, duck calls, hunting blinds and a camouflage outfit, can be quite challenging.

Paramount to every hunt is making sure that all hunting equipment is properly transported to the hunting location, missing one piece of equipment can make the hunt unsuccessful. However, the overall weight of the hunting equipment can be heavily burdensome to the avid hunter during transport. Thus, it's desired to transport as much equipment as humanly possible in the least amount of trips.

The present invention provides an apparatus for substantially reducing the problems associated with the transport of hunting equipment to and from the hunting location. The difficulties inherent in the art are therefore overcome in a way which is simple, user friendly, and efficient.

SUMMARY

For the foregoing reasons, what is needed is to provide a waterfowl decoy carrier which is configured to hold a plurality of waterfowl decoys in a balanced, hands free manner for efficient transport to and from a desired hunting location. The carrier is uniquely configured to allocate, distribute, and balance the weight and accommodate the irregular shaped decoys radially about the hunter's midsection while supported by the hunter's shoulders. This advantageous configuration provides the hunter more versatility and operability by allowing the hunter to carry other equipment simultaneously with the decoys in the most efficient manner possible.

In a particular version, the waterfowl decoy carrier generally comprises: a rectangular body having a top perimeter having a midpoint, a bottom perimeter, a first end side and a second end side. The rectangular body includes a front panel and a rear panel, wherein the front panel and the rear panel are configured to form a plurality of upward opening linearly aligned pockets. Each pocket is configured and sized to receive one or more waterfowl decoys. Further, at least one strap is provided having a length, a first end, a second end, and an approximate center which is operably attached to the top perimeter of the rectangular body. The strap is configured to position the rectangular body radially about the user's midsection while the strap is worn over the user's shoulders, thereby actively balancing and distributing the weight evenly about the hunter's midsection.

Moreover, in an alternative version of the invention, one or more waterfowl decoy carriers can be used in combination to provide a visual blind barrier forming a waterfowl hunting blind system.

In a version of the waterfowl hunting blind system, a plurality of blind support stakes, ideally at least three, are utilized together in order to support the one or more waterfowl decoy carriers in a blind configuration, supporting a first decoy carrier above a second decoy carrier, thereby creating a visual barrier between the hunter and the waterfowl flying overheard.

In yet another version of the waterfowl hunting blind system, each blind support stake comprises a base, a vertical segment and an angled top segment. The base having bifurcated ground insertion members for supporting the structure in the ground, the vertical segment is integral with the base and has a means for connecting to the top perimeter of the first rectangular body, and the angled top segment is integral with the vertical segment and has a means for connecting to the top perimeter of the second rectangular body.

Still other versions, benefits and advantages of the invention will become apparent to those skilled in the art to which it pertains upon a reading and understanding of the following detailed specification.

BRIEF DESCRIPTION OF THE DRAWINGS

These and other features, aspects, and advantages of the present invention will become better understood with regard to the following description, appended claims, and accompanying drawings where:

FIG. 13 is a front perspective view of the decoy carrier blind system partially assembled utilizing a first, lower decoy carrier of the version shown in FIG. 11;

FIG. 14 is an assembled view of the blind support stake of the decoy carrier blind system of the version shown in FIG. 11; and FIG. 15 is an exploded view of an unassembled blind support stake of the decoy carrier blind system of the version shown in FIG. 11.

DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense but is made merely for the purpose of illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Figure 1:
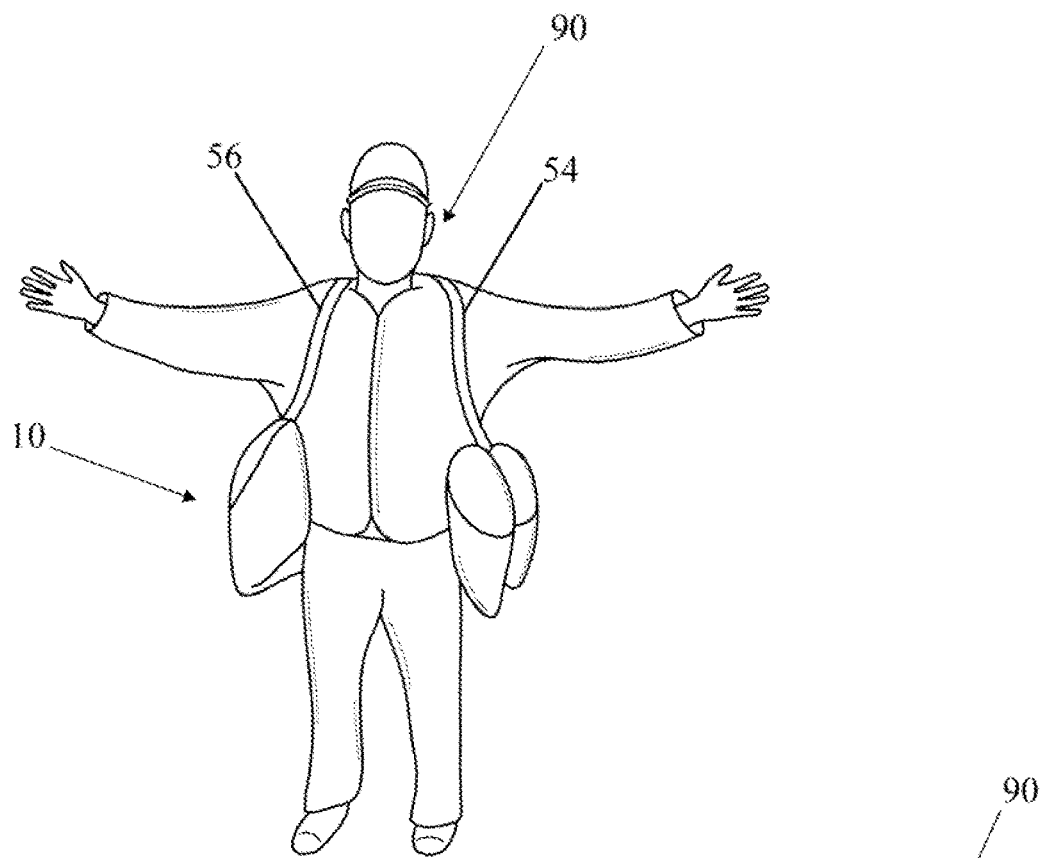
FIG. 1 is an illustrative front perspective view of a version of the waterfowl decoy carrier as supported by a hunter.
Figure 2:
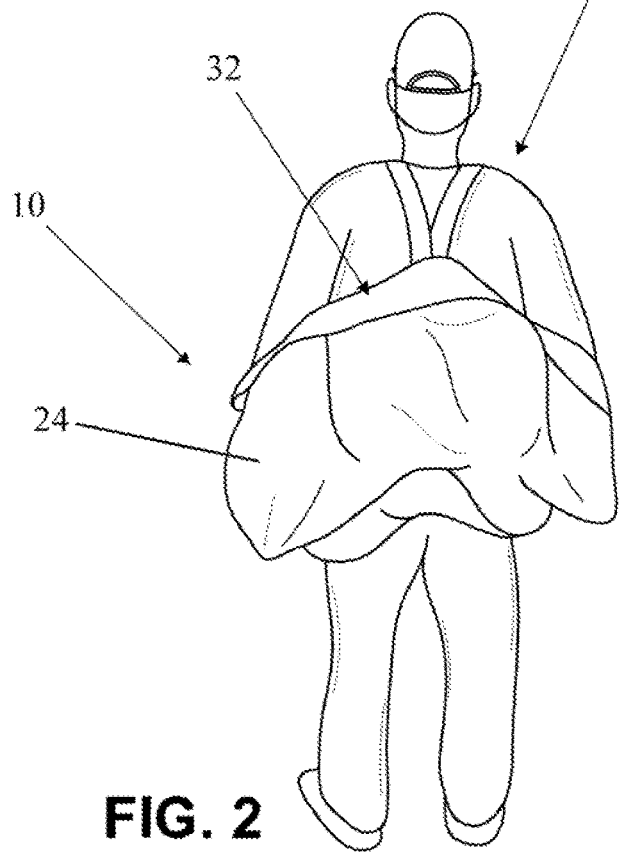
FIG. 2 is an illustrative rear perspective view of the version shown in FIG. 1 as supported by a hunter.
Figure 3:
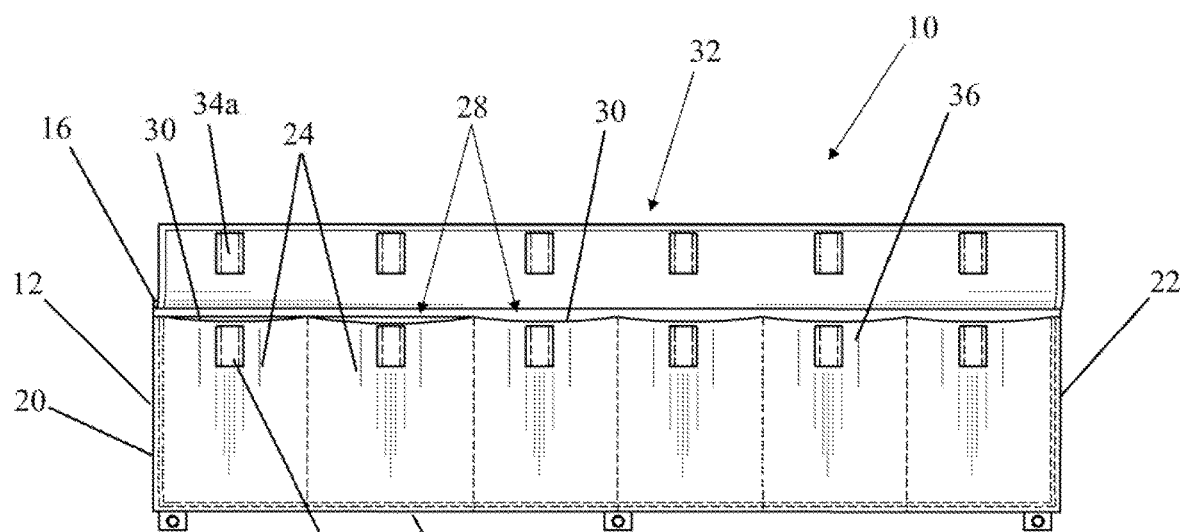
FIG. 3 is a front elevation view showing the waterfowl decoy carrier with the upper flap closure in the open position of the version shown in FIG. 1.
Figure 4:
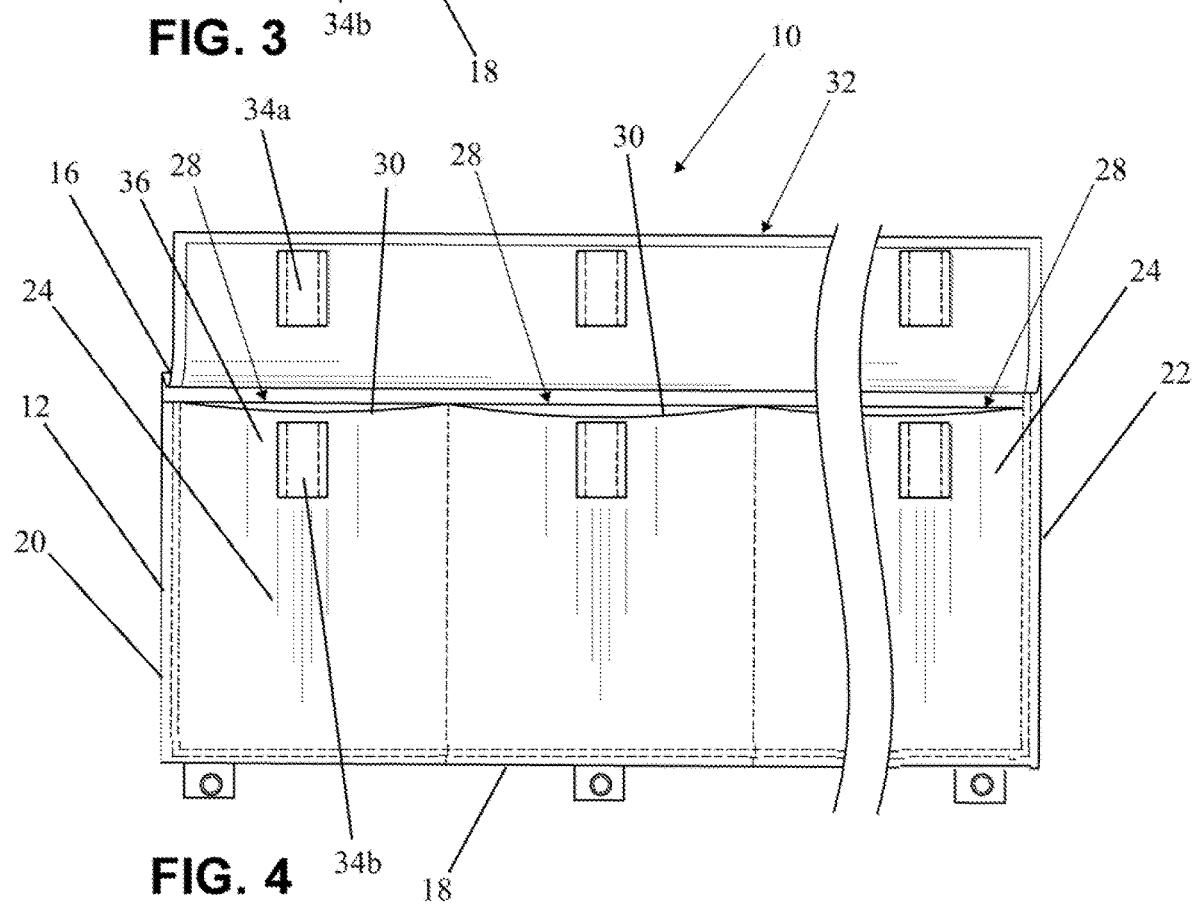
FIG. 4 is a front elevation view showing a version having an indefinite number of pockets and an indefinite length.

With reference now to the drawings, and in particular to FIG. 1-FIG. 10 thereof, a new waterfowl decoy carrier 10 is provided which is configured to hold a plurality of waterfowl decoys 02 in a balanced, hands free manner for efficient transport to and from a desired hunting location. As best illustrated in FIG. 1 and FIG. 2, the waterfowl decoy carrier 10 is configured to be supported by the hunter's shoulder while equally distributing the weight of the waterfowl decoys 02 radially about the hunter's 90 midsection, balancing the weight equally and effectively about the hunter 90. This configuration provides the hunter with the ability to carry the plurality of waterfowl decoy 02 in a hands free fashion; operably allowing the hunter 90 to carry other equipment in the most efficient manner possible.

Moreover, as an option, the waterfowl decoy carrier 10 can be utilized by itself or in combination with one or more other waterfowl decoy carriers 10 and two or more blind support stakes 72 to form a waterfowl hunting blind 70 (see FIG. 11-FIG. 14), further reducing the amount and weight of the equipment required to be transported for the hunt.

Figure 7:
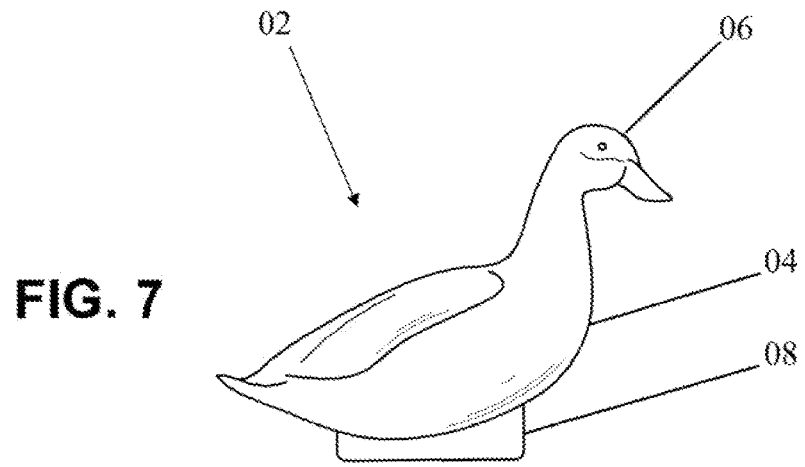
FIG. 7 is an illustration of an example waterfowl decoy as is customarily known in the art.
Figure 8:
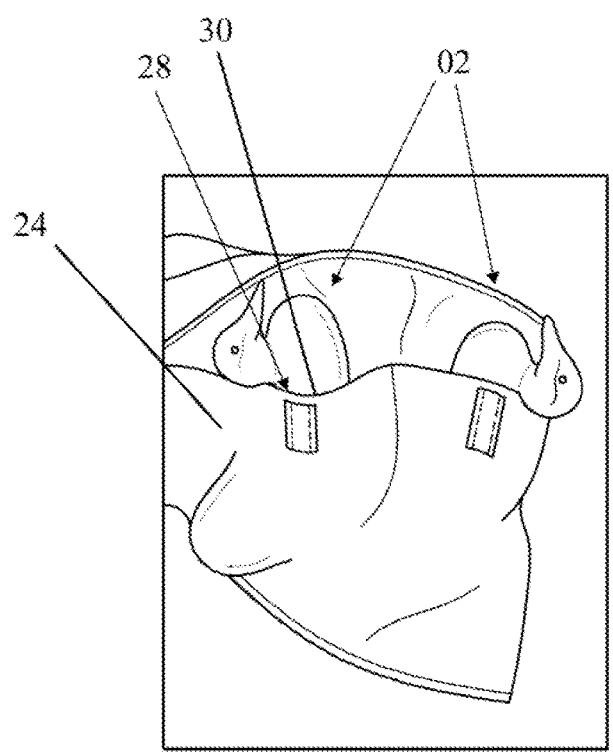
FIG. 8 is an illustrative view showing an up-close view of decoys loaded within the pockets of the waterfowl decoy carrier of the version shown in FIG. 1.
Figure 9:
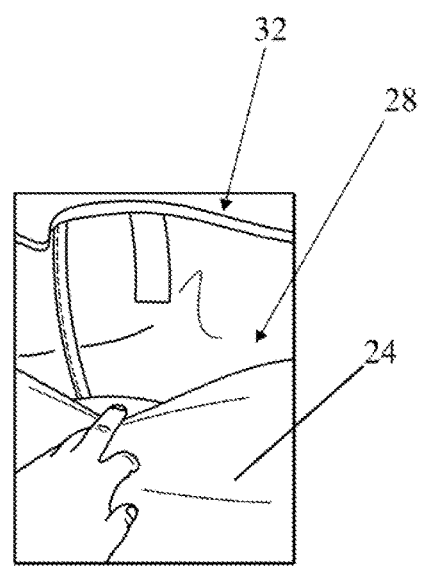
FIG. 9 is an illustrative up-close view of an upward opening pocket of the waterfowl decoy carrier of the version shown in FIG. 1.

As best illustrated by FIG. 7, a typical waterfowl decoy 02 as known in the hunting art generally comprise a body 04, a head 06, and a keel 08. The waterfowl decoys 02 are typically manufactured of a durable plastic or even wood. The decoy body 04 is typically hollow on the inside providing flotation of the decoy 02 when placed in a body of water. The keel 08 typically provides stability while floating in a body of water and provides a surface configuration for winding the decoy 02 anchor (not shown) around while the decoy 02 is stored or transported.

Referring now to FIG. 3-FIG. 6, a version of the waterfowl decoy carrier 10 will be described in detail. In the version, the waterfowl decoy carrier 10 generally comprises a rectangular body 12 and at least one strap 14 for supporting the rectangular body 12 about the hunter's 90 shoulder and body. The rectangular body 12 has a top perimeter 16, a bottom perimeter 18, a first end side 20 and a second end side 22. Ideally, to fit the average sized waist circumference of a hunter, the width of the rectangular body 12 is preferably between 5-7 feet and the height of the rectangular body 12 is preferably between 12-30 inches. Ideally, the rectangular body 12 is approximately 6 feet in width by 19 inches in height.

In further detail, the rectangular body 12 generally comprises a front flexible panel 24 and a rear flexible panel 26. The front and rear flexible panels 24, 26 are preferably made of a flexible material such as plastics, synthetics, cloth or the like, and are permanently interconnected, as by stitching, at their margins. In the illustrated version, the front flexible panel 24 and the rear flexible panel 26 are coupled and configured together by stitching to form a plurality of linearly aligned upwardly opening rectangular pockets 28. Each upward opening 30 located near the top perimeter 16 of the rectangular body 12. The pockets 28 each are configured and sized to receive one or more typical sized waterfowl decoys 02 as is known in the art. Waterfowl decoys can vary in size depending on the type of waterfowl hunted. Duck decoys tend to be smaller in nature, whereas goose decoys are larger. Thus, the pockets 28 can vary in dimension and in number according to the size of the desired waterfowl decoy 02. In the ideal version (FIG. 3), there are at least six (6) linearly aligned upwardly opening pockets 28. Preferably, the dimension of each pocket 28 ranges from 10-18 inches in width by 14-30 inches in height. Ideally for duck sized decoys, the dimension of each pocket 28 is approximately 12 inches in width by 18 inches in height.

In the illustrated version, an upper flap closure 32 is provided in order to provide closure to each pocket 28 upward opening 30 in order to seal the waterfowl decoys 02 within each pocket 28 during transport. Generally, the upper flap closure 32 is positioned at the top perimeter 16 of the rectangular body 12 and is integral with the rear flexible panel 26. The upper flap closure 32 folds over from the rear to the front, covering each upward opening 30 pocket 28 and attaching to the front flexible panel 24 by a flap connection means 34. In the version, the flap connection means 34a, 34b are hook and loop fasteners located at the upper center exterior surface 36 of each pocket 28 and corresponding inner surface 38 of the upper flap closure 32.

Figure 5:
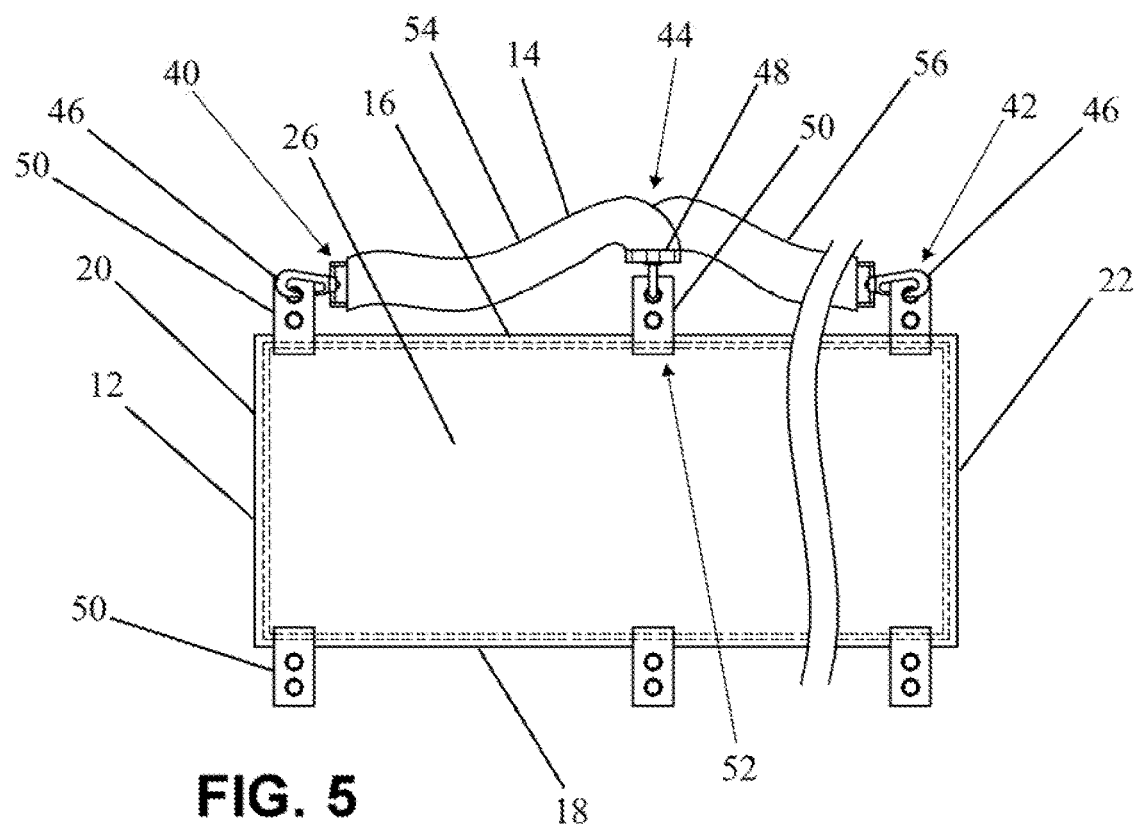
FIG. 5 is a rear elevation view showing a version of the strap configuration utilizing a single strap having a slidable type fastener of the version shown in FIG. 1.
Figure 6:
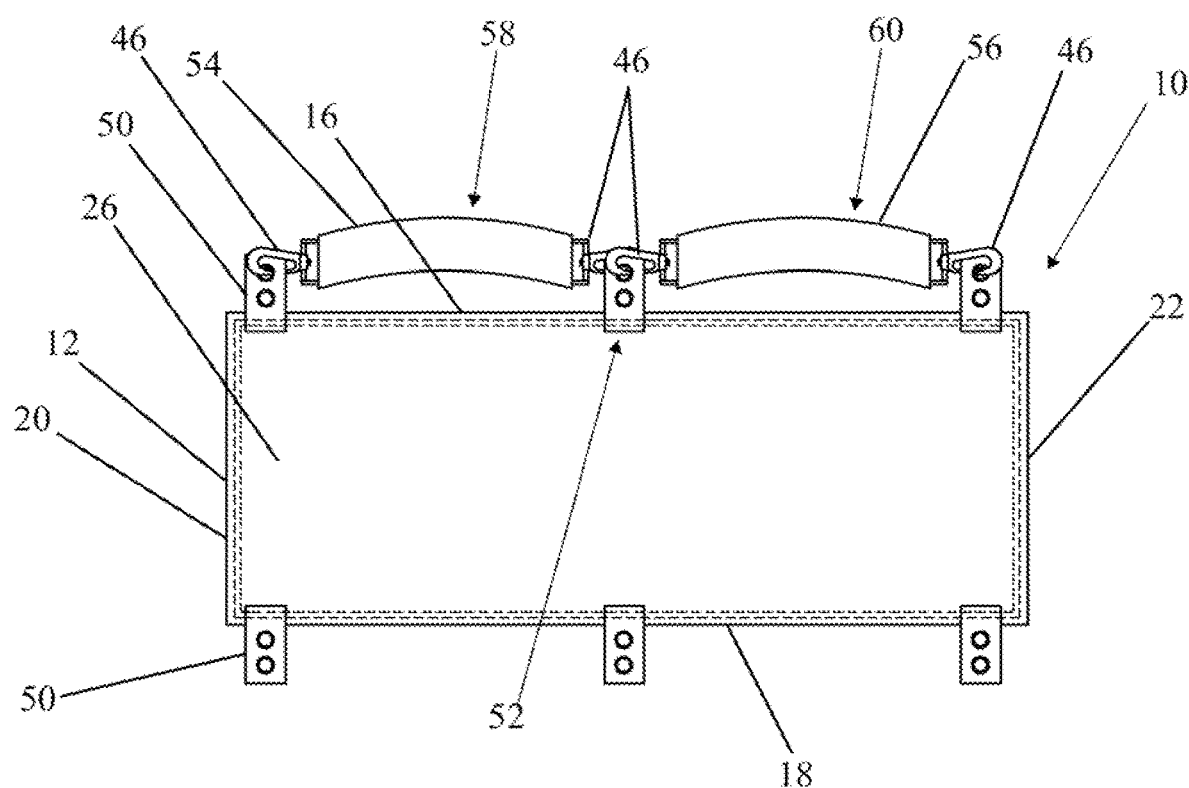
FIG. 6 is a rear elevation view showing an alternative version of the strap configuration utilizing two (2) straps having fixed clip fasteners.
Figure 10:
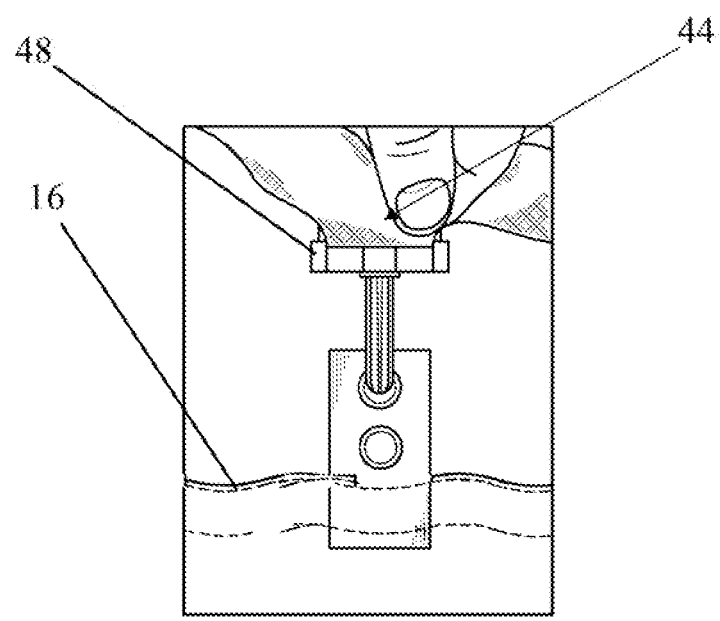
FIG. 10 is an up-close view showing the slidable type fastener connecting the strap to the center connection tab of the waterfowl decoy carrier of the version shown in FIG. 5.

As best illustrated by FIG. 5, FIG. 6, and FIG. 10, the at least one strap 14 for supporting the rectangular body 12 about the hunter 90, utilizing the hunter's 90 shoulders for support is disclosed. The strap 14 has a first end 40, a second end 42, and an approximate center 44 equidistant from each of the first and second ends 40, 42 respectively. The first and second ends 40, 42 each have a spring hook fastener 46 and at the approximate center 44 have a slidable hook type fastener 48 shown in detail in FIG. 10. The first end 40 spring hook fastener 46 is removably attachable to the top perimeter 16 near the first end side 20 of the rectangular body 12 and the second end 42 spring hook fastener 46 is removably attachable to the top perimeter 16 near the second end side 22 of the rectangular body 12. The rectangular body 12 has respective connection tabs 50 located at the top perimeter 16 margins and at the midpoint in order to provide reinforced attachment points for the fasteners.

In the depicted version of FIG. 5, the approximate center 44 of the strap 14 has a slidable spring hook fastener 48 which is attached to the rectangular body 12 at the top perimeter 16 approximate lateral midpoint 52. The slidable spring hook fastener 48 bisects the strap 14 into a first segment 54 and a second segment 56. Because the fastener 48 is slidable along the strap 14, the first and second segment lengths 54, 56 can be adjusted in order to accommodate different load distributions about the hunter 90. The unique strap 14 configuration provides three points of connection to the rectangular body 12 using only one strap 14—which is inherently adjustable. It will be known that a fixed spring hook fastener 46 can be utilized as an alternative to the slidable spring hook fastener 48, however it is not considered superior.

Referring to FIG. 1 and FIG. 2, while the waterfowl decoy carrier 10 is worn, the first segment 54 is placed over the hunter's first shoulder and the second segment 56 is placed over the hunter's opposing shoulder, thereby draping the rectangular body 12 radially about the hunter's 90 midsection or waist supported by three points of fasteners along the top perimeter 16 of the rectangular body 12. This load configuration allows for even distribution of weight on the hunter's 90 shoulders and—more importantly—frees the hunter's 90 hands to perform other tasks or carry other hunting equipment for the desired hunt.

It is envisioned, that the waterfowl decoy carrier 10 could utilize more than one strap 14. In another version as illustrated by FIG. 6, a first strap 58 and a second strap 60 is provided. The first strap 58 functioning as the first segment 54 between the first end side 20 and the approximate lateral midpoint 52 of the top perimeter 16 rectangular body 12 and the second strap 60 functioning as the second segment 56 between the approximate lateral midpoint 52 and the second end side 22 of the rectangular body 12. This configuration would not support adjustment of the first and second segment lengths 54, 56 which was carried out by a slidable fastener 48 as taught in earlier versions. Fixed spring hook fasteners 46 would be utilized at each end of both straps to connect to the rectangular body 12 via the connection tabs 50. However, other means of adjustment can be utilized such as incorporating a slidable buckle integrated with each strap in order to adjust each segment length.

Referring now to FIG. 11-FIG. 15, in a unique version of the invention, a waterfowl hunting blind system 70 is provided. The waterfowl hunting blind system 70 generally comprises two or more blind support stakes 72 and at least one rectangular body 12 as described above, preferably at least two rectangular bodies 12. The at least two blind support ground stakes 72 support the rectangular bodies 12a, 12b in a stacked configuration (See FIG. 12) which form a blind configuration—creating a continuous visual barrier between the hunted waterfowl and the hunter 90 lying in wait.

As best illustrated by FIG. 14 and FIG. 15, each blind support stake 72 generally comprises a base 74, a vertical segment 76 integral with the base 74, and an angled top segment 78 integral with the vertical segment 76. The base 74 having bifurcated ground insertion spikes 80 for supporting the blind support stake 72 and blind structure in the ground surface. The vertical segment 76 is formed of a linear rod.

The top of the vertical segment 76 has a means for connecting 82 to the top perimeter 16a of a first, lower rectangular body 12a. In the version, the means for connecting 82 to the top perimeter 16 is an upward extending hook, which is adapted to receive a respective connection tab 50 of the first, lower rectangular body 12a—allowing the first, lower rectangular body 12a to hang downward in conjunction with the other blind support stakes 72.

The angled top segment 78 supports in conjunction with the other blind support stakes 72 the second, upper rectangular body 12b at an angle with respect to the ground surface by a second upward extending hook 84 which couples with the top perimeter 16b of the second, upper rectangular body 12b—providing a superior visual barrier, particular as seen from a bird's eye view.

Figure 11:
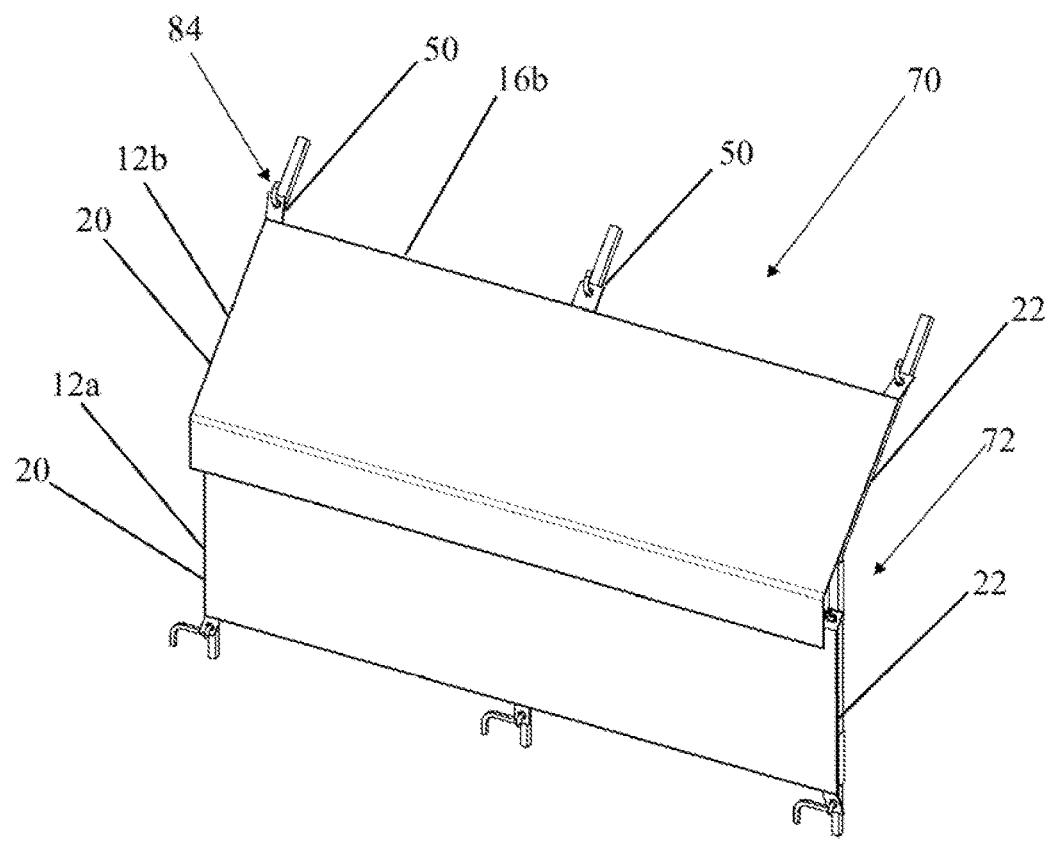
FIG. 11 is a front perspective view of the waterfowl decoy carrier blind system utilizing at least two decoy carriers.
Figure 12:
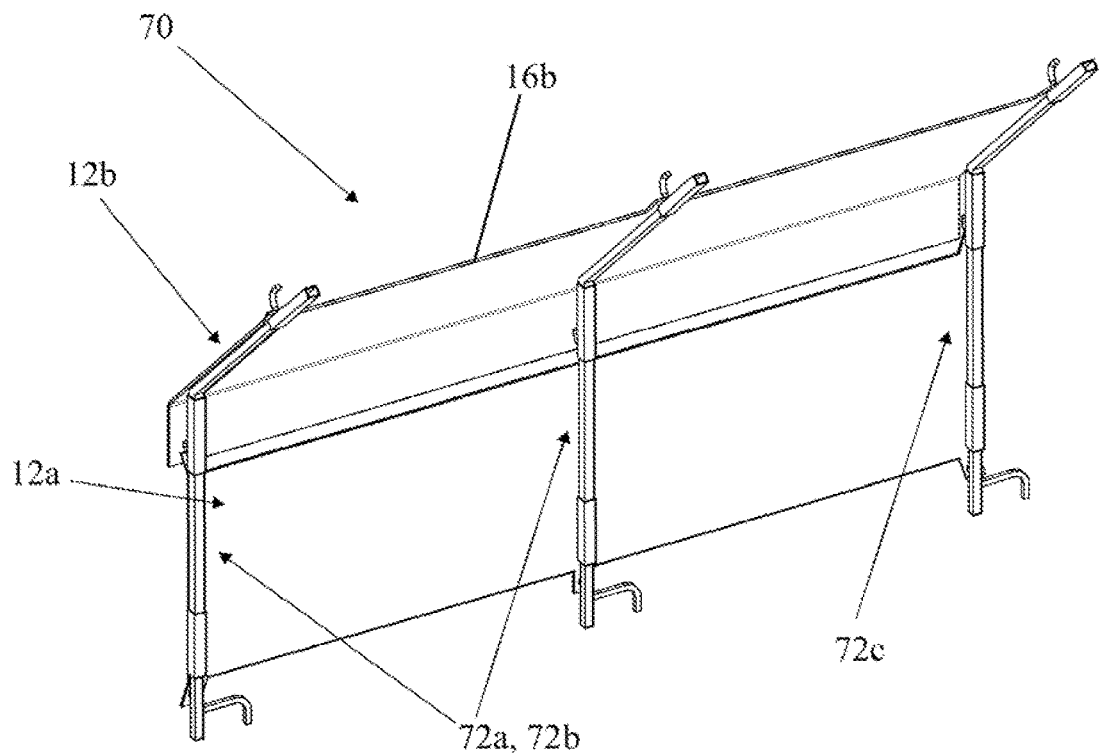
FIG. 12 is a rear perspective view of the decoy carrier blind system of the version shown in FIG. 11.

In the illustrated version and as best illustrated in FIG. 11-FIG. 13, the blind system comprises two rectangular bodies 12a, 12b as described above along with three blind support stakes 72a, 72b, and 72c as described above. The blind support stakes 72 are aligned and embedded via the bifurcated ground insertion spikes 80 into the ground in order to support the rectangular bodies 12a, 12b as a visual barrier forming a waterfowl hunting blind system 70. As best viewed in FIG. 13, a first blind support stake 72a is positioned to extend vertically upward along the first end sides 20 of each rectangular body 12a, 12b and a second blind support stake 72c is positioned to extend vertically upward along the second end sides 22 of each rectangular decoy body 12a, 12b. A third blind support stake 72b is positioned at the approximate lateral midpoint 52 of the top perimeters 16 of the rectangular bodies 12a, 12b. Each blind support stake 72 is attached to the ground surface via the bifurcated ground insertion spikes 80 at each respective base 74.

As illustrated in FIG. 12, the lower, first rectangular body 12a is attached to each of the three blind support stakes 72a, 72b, and 72c near the top of the vertical segments 76 by the upward extending hooks 82 engaging with respective connection tabs 50 located at the top perimeter 16. This configuration supports the lower, first rectangular body 12a in a vertical blind position, providing a visual barrier for the lower portion of the hunting blind 70. The upper, second rectangular body 12b is attached to the angled top segment 78 of each blind support stakes 72a, 72b, and 72c in the same manner by attaching to the upward extending hooks 84 which engage with the upper, second rectangular body 12b respective connection tabs 50, allowing the second rectangular body 12b to drape downward at an angle with respect to the ground, providing a visual barrier to the upper portion of the waterfowl hunting blind system 70.

Optionally, as illustrated in FIG. 15, each blind support stake 72 may break down into constituent parts for storage purposes. Thus, the base 74 and the angled top segment 78 can be separated from the vertical segment 76, breaking down into three (3) parts which may be easily transported or stowed.

The present invention can be made in any manner and of any material chosen with sound engineering judgment. Preferably, materials will be strong, lightweight, long lasting, economic, and ergonomic.

The previously described versions of the present invention have many advantages, including providing a unique decoy carrying configuration which distributes the weight of the decoys and the carrier evenly about the hunter and shoulders during transport to and from the hunting site. Moreover, when utilizing more than one waterfowl decoy carrier 10, the rectangular bodies 12 can be utilized both as a waterfowl decoy carrier 10 and as part of a hunting blind system 70 which is easily assembled and transportable—further reducing the amount of hunting equipment to be transported to and from the hunting site. Overall, the waterfowl decoy carrier 10 and the waterfowl hunting blind system 70 decrease the workload required by the hunter and increasing the efficiency of the hunt—providing an environment that is favorable for a successful waterfowl hunt.

The invention does not require that all the advantageous features and all the advantages need to be incorporated into every version of the invention.

Although preferred versions of the invention have been described in considerable detail, other versions of the invention are possible.

All the features disclosed in this specification (including and accompanying claims, abstract, and drawings) may be replaced by alternative features serving the same, equivalent, or similar purpose unless expressly stated otherwise. Thus, unless stated otherwise, each feature disclosed is one example only of a generic series of equivalent or similar features.

What is claimed is:

1. A waterfowl decoy carrier blind system, comprising:
   a first and a second rectangular bodies, each having a top perimeter, a bottom perimeter, a first end side and a second end side, each rectangular body comprising a plurality of upward opening linearly aligned rectangular pockets, each pocket configured and sized to receive one or more waterfowl decoys;
   each rectangular body having at least one strap having a length, a first end, a second end, and an approximate center, wherein the strap is operably attached to the top perimeter of the rectangular body; and
   at least two blind support stakes for supporting the first and second rectangular bodies in a blind configuration, wherein each blind support stake comprises a base, a vertical segment and an angled top segment, wherein the vertical segment is integral with the base and has a means for connecting to the top perimeter of the first rectangular body, and the angled top segment is integral with the vertical segment and has a means for connecting to the top perimeter of the second rectangular body.

2. The waterfowl decoy carrier blind system of claim 1, wherein the means for connecting is an upward extending hook.

3. The waterfowl decoy carrier blind system of claim 1, wherein a first blind support stake is positioned upright at the first end sides of the first and second rectangular bodies, a second blind support stake is positioned upright at the center of the first and second rectangular bodies, and a third blind support is positioned upright at the second end sides of the first and second rectangular bodies, wherein the second rectangular body is draped above the first rectangular body forming a continuous visual barrier.

4. The waterfowl decoy carrier blind system of claim 1, wherein the base, the vertical segment and the angled top segment are attachably removable from each other, thereby during storage each blind support stake can break down into constituent parts.

5. The waterfowl decoy carrier blind system of claim 4, wherein the base having bifurcated ground insertion members for supporting the blind system in the ground.

6. The waterfowl decoy carrier blind system of claim 1, wherein the base having bifurcated ground insertion members for supporting the blind system in the ground.

\* \* \* \* \*